United States Patent
Behrangrad

(10) Patent No.: US 10,135,246 B2
(45) Date of Patent: Nov. 20, 2018

(54) DEVICE CONTROL APPARATUS AND DEMAND RESPONSE METHOD

(71) Applicant: Panasonic Intellectual Property Management Co., Ltd., Osaka (JP)

(72) Inventor: Mahdi Behrangrad, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 111 days.

(21) Appl. No.: 15/257,793

(22) Filed: Sep. 6, 2016

(65) Prior Publication Data
US 2016/0372923 A1    Dec. 22, 2016

Related U.S. Application Data

(63) Continuation of application No. PCT/JP2015/003648, filed on Jul. 21, 2015.

(30) Foreign Application Priority Data

Nov. 13, 2014  (JP) .................................. 2014-231096

(51) Int. Cl.
*H02J 13/00* (2006.01)
*H02J 3/14* (2006.01)
(Continued)

(52) U.S. Cl.
CPC .............. *H02J 3/14* (2013.01); *H02J 7/0021* (2013.01); *H02J 7/0047* (2013.01); *H02J 13/00* (2013.01);
(Continued)

(58) Field of Classification Search
CPC . H01F 38/14; H02J 50/10; H02J 50/12; H02J 50/70; H02J 50/90; H04B 5/0037; H04B 5/0081
See application file for complete search history.

(56) References Cited

U.S. PATENT DOCUMENTS

2010/0244563 A1    9/2010  Fleck
2010/0274405 A1   10/2010  Thomas et al.
(Continued)

FOREIGN PATENT DOCUMENTS

CN   101897097 A   11/2010
JP   2013-230056   11/2013
(Continued)

OTHER PUBLICATIONS

The Extended European Search Report dated Oct. 18, 2017 for the related European Patent Application No. 15859364.0.
(Continued)

*Primary Examiner* — Rexford Barnie
*Assistant Examiner* — Elim Ortiz
(74) *Attorney, Agent, or Firm* — Greenblum & Bernstein, P.L.C.

(57) ABSTRACT

A apparatus includes: a detector that detects a parameter that indicates a state of an electric power system; a first communication interface that communicates with a device that receives power supplied from the electric power system; a second communication interface that receives a demand response signal from a server that monitors a state of the electric power system; and a control circuit that controls the device via a first communication interface. The demand response signal contains either first information indicating an instruction for increasing the amount of power supplied from the electric power system to the device or second information indicating an instruction for decreasing the amount of power supplied from the electric power system to the device, and the control circuit determines whether control of the device is performed in accordance with the demand response signal based on the first information or second information contained and the detected parameter.

5 Claims, 9 Drawing Sheets

(51) Int. Cl.
*H02J 7/00* (2006.01)
*H04L 29/06* (2006.01)

(52) U.S. Cl.
CPC ...... *H02J 13/0006* (2013.01); *H04L 63/1466* (2013.01); *Y02B 70/3225* (2013.01); *Y04S 20/222* (2013.01); *Y04S 40/24* (2013.01)

(56) References Cited

U.S. PATENT DOCUMENTS

| | | |
|---|---|---|
| 2011/0208366 A1 | 8/2011 | Taft |
| 2013/0015716 A1 | 1/2013 | Matsushima et al. |
| 2013/0289773 A1 | 10/2013 | Waki |
| 2016/0033986 A1* | 2/2016 | Kamel .................. H02J 3/381 700/295 |

FOREIGN PATENT DOCUMENTS

| | | |
|---|---|---|
| JP | 2014-124067 | 7/2014 |
| WO | 2012/105210 | 8/2012 |

OTHER PUBLICATIONS

English Translation of Chinese Search Report dated May 16, 2017 for the related Chinese Patent Application No. 201580010691.6.
International Search Report of PCT application No. PCT/JP2015/003648 dated Oct. 13, 2015.

* cited by examiner

FIG. 5A

| 1 | 2 | 3 | |
|---|---|---|---|
| FREQUENCY TYPE | INCREASE LOAD OR DECREASE LOAD | ELECTRIC POWER VALUE OR PERMISSIBLE RANGE OF ELECTRIC POWER VALUE | ... |

FIG. 5B

| 1 | 2 | 3 | |
|---|---|---|---|
| VOLTAGE TYPE | GENERATE REACTIVE POWER OR ABSORB REACTIVE POWER | ELECTRIC POWER VALUE OR PERMISSIBLE RANGE OF ELECTRIC POWER VALUE | ... |

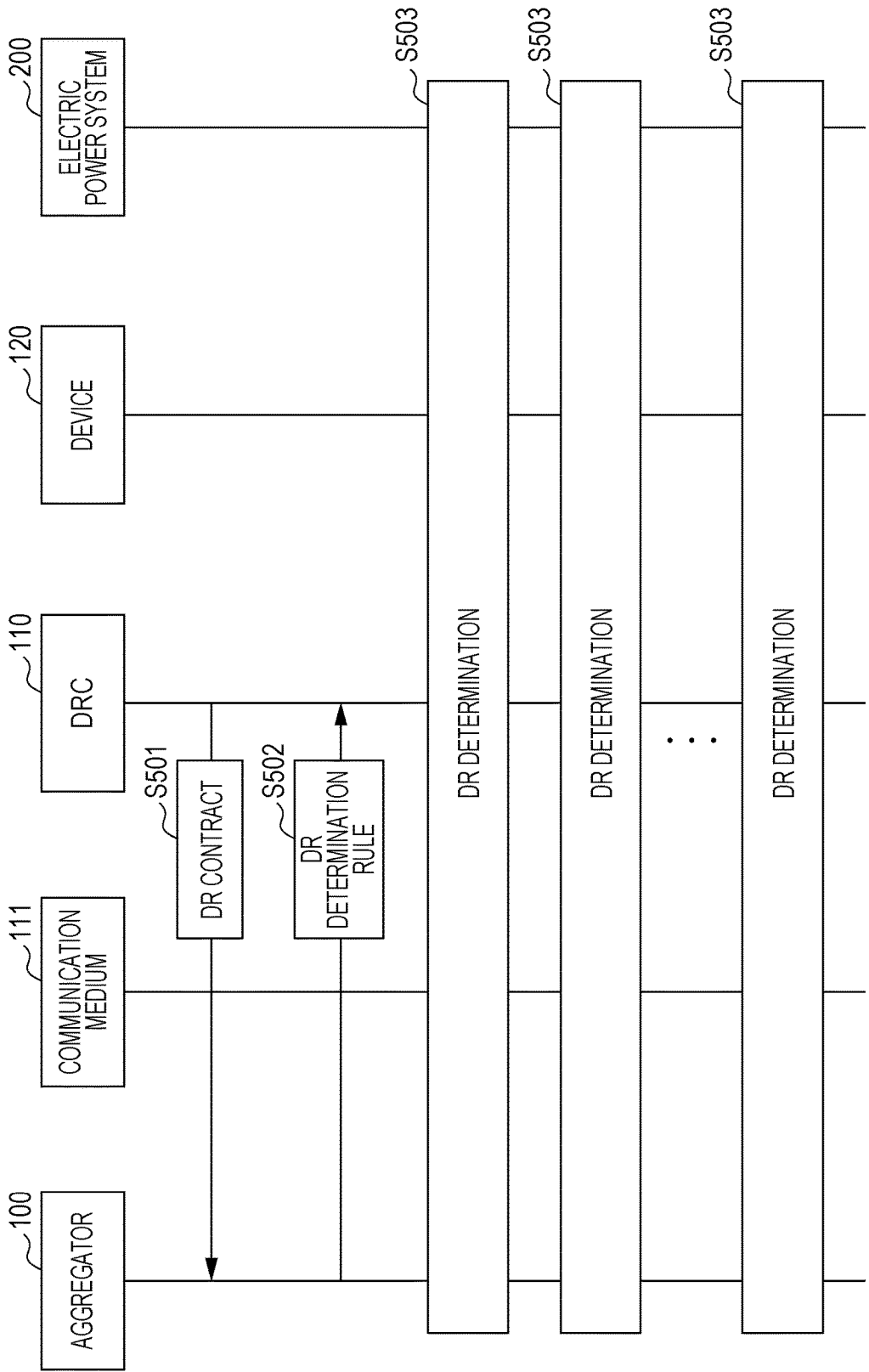

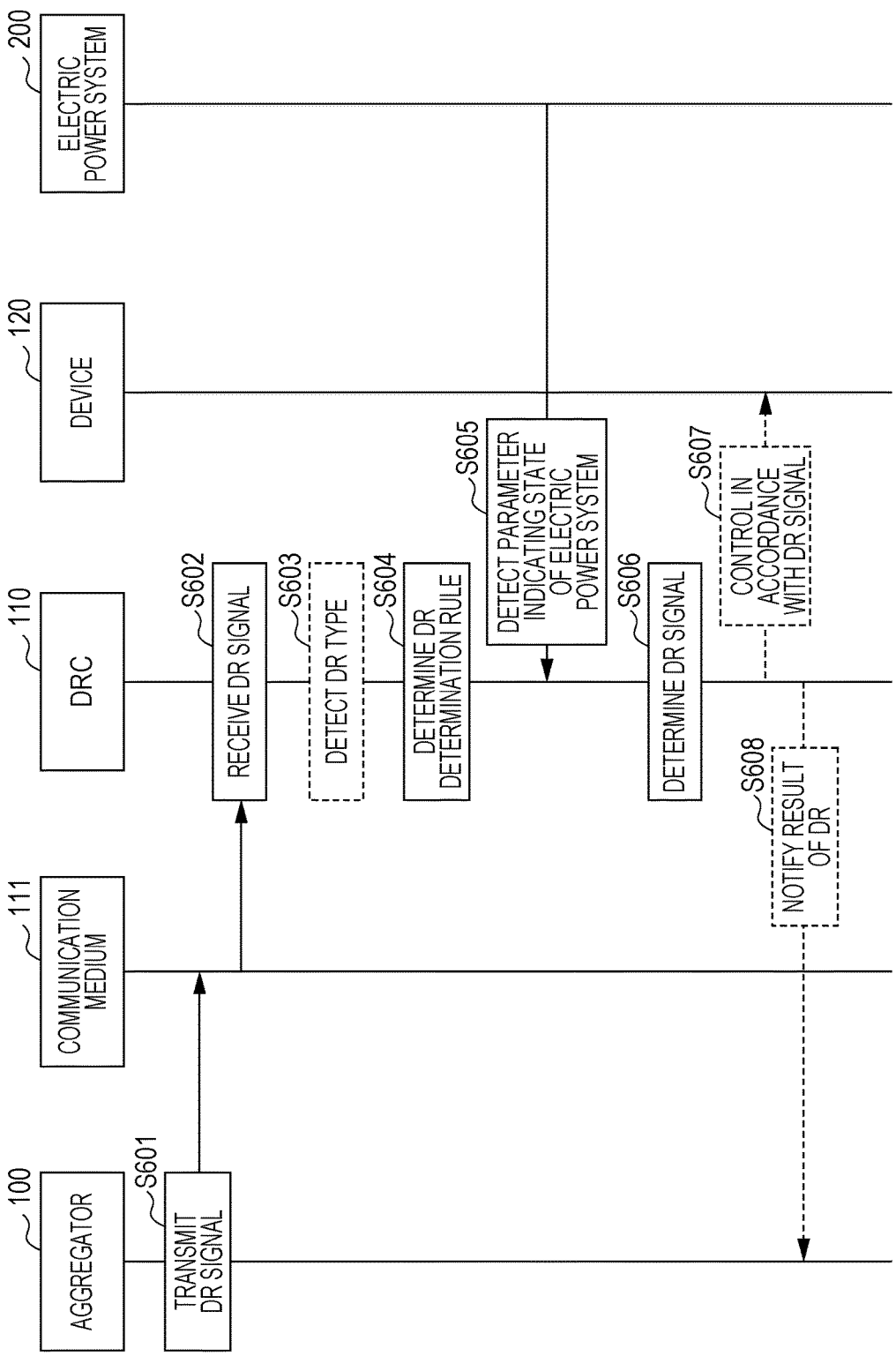

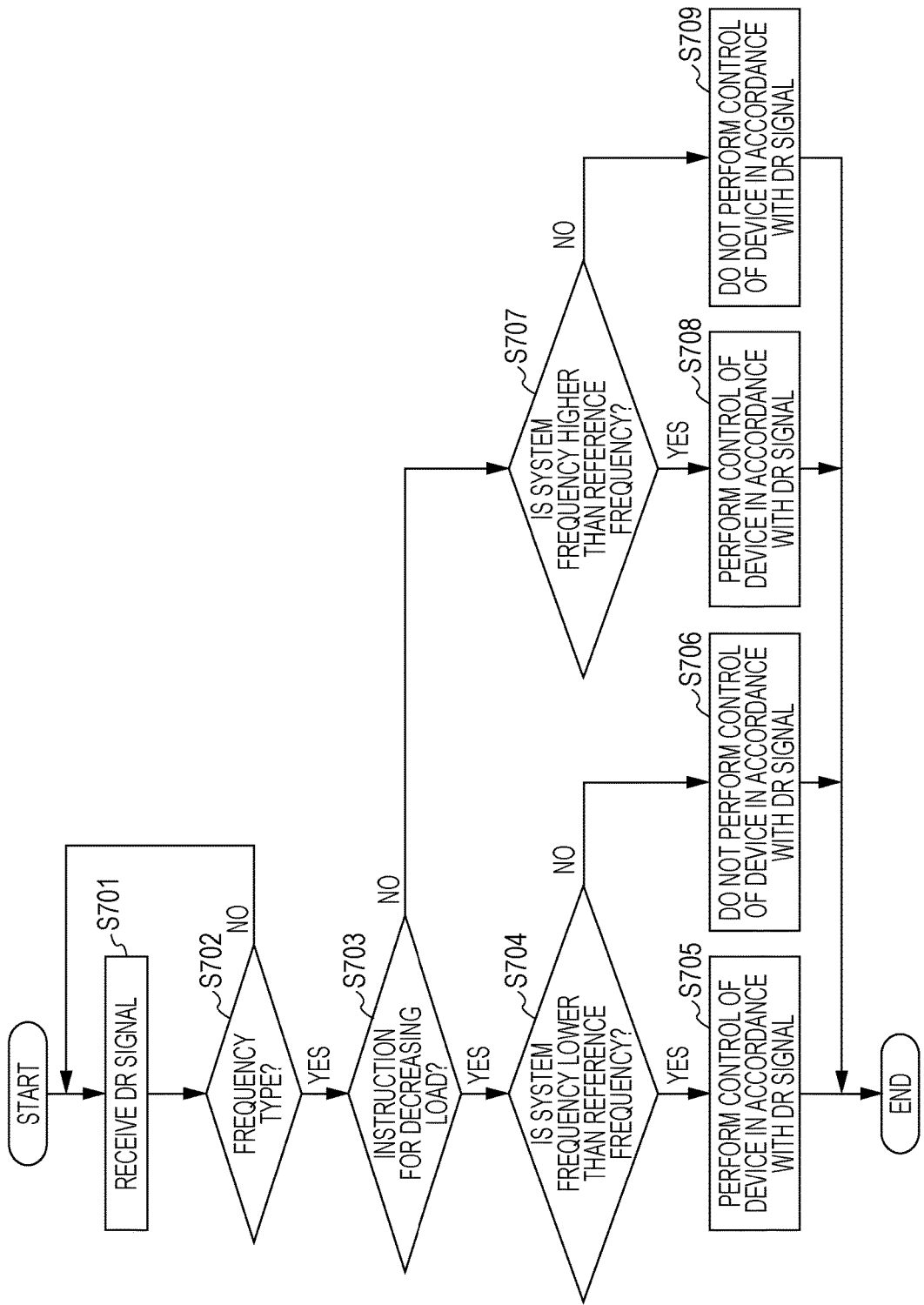

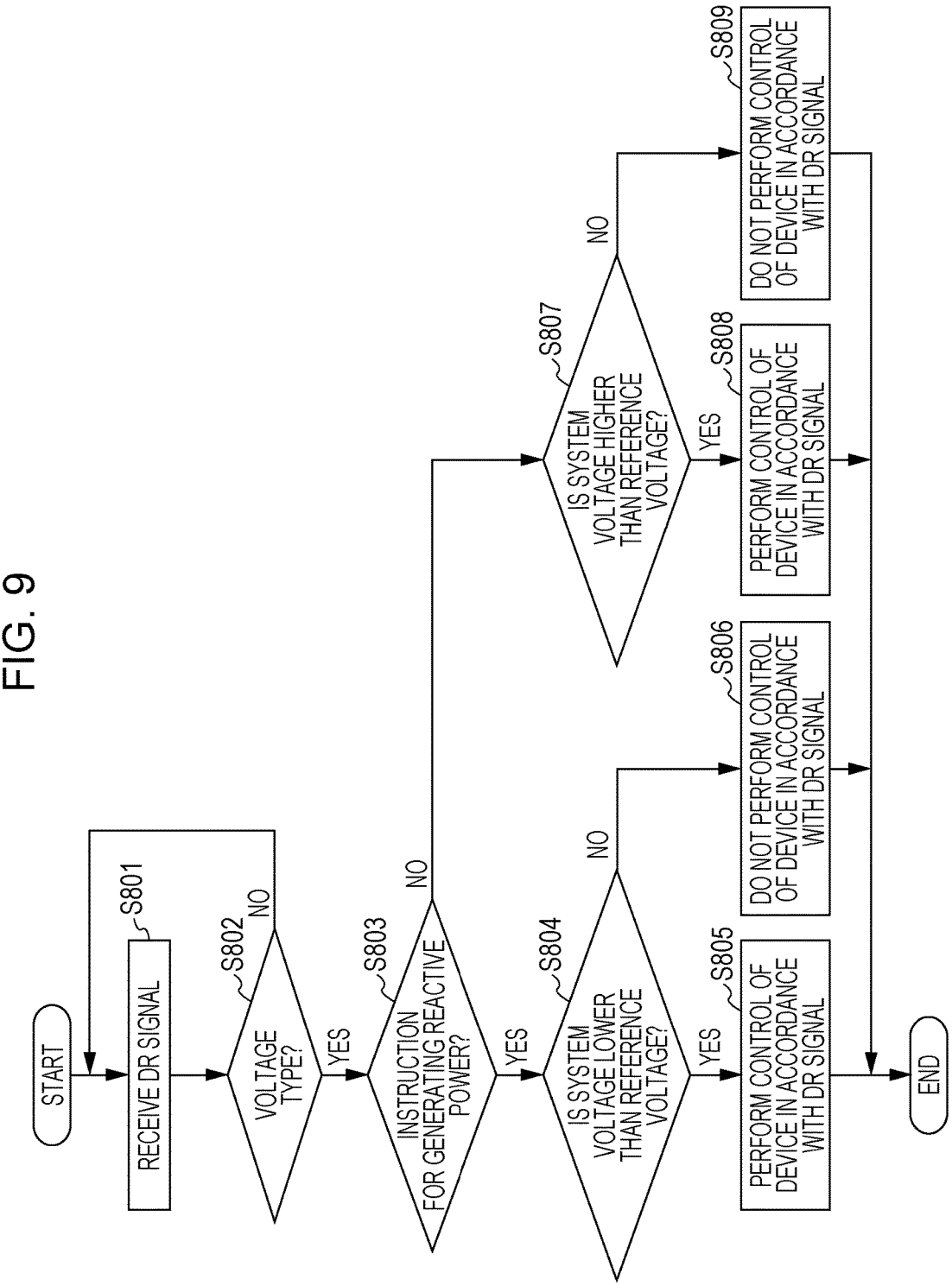

DEVICE CONTROL APPARATUS AND DEMAND RESPONSE METHOD

BACKGROUND

1. Technical Field

The present disclosure relates to a device control apparatus and a demand response (DR) method with which demand response is performed.

2. Description of the Related Art

Conventionally, there is a device control apparatus that receives a DR signal for controlling power supplied from an electric power system to a device. Japanese Unexamined Patent Application Publication No. 2013-230056 discloses a technique related to such a device control apparatus. The device control apparatus having received a DR signal performs control of the device in accordance with the DR signal.

SUMMARY

However, since a conventional device control apparatus performs control of a device in accordance with an instruction contained in a received DR signal, execution of appropriate DR is disabled when the received DR signal is unauthorized.

One non-limiting and exemplary embodiment provides a device control apparatus and a demand response method that can prevent control of a device from being performed in accordance with an unauthorized DR signal.

In one general aspect, the techniques disclosed here feature a device control apparatus includes: a detector that detects a parameter that indicates a state of an electric power system; a first communication interface that communicates with a device that receives power supplied from the electric power system; a second communication interface that receives a demand response signal from a server that monitors a state of the electric power system; and a control circuit that controls the device via a first communication interface. The demand response signal contains either first information or second information, the first information indicating an instruction for increasing the amount of power supplied from the electric power system to the device, the second information indicating an instruction for decreasing the amount of power supplied from the electric power system to the device, and the control circuit determines whether control of the device is performed in accordance with the demand response signal based on the first information or second information contained in the received demand response signal and the detected parameter.

It should be noted that general or specific embodiments may be implemented as a system, an apparatus, a method, a recording medium, a computer program, or any selective combination thereof.

According to a device control apparatus and a demand response method of the present disclosure, control of a device is prevented from being performed in accordance with an unauthorized DR signal.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 5A and 5B are diagrams illustrating examples of a packet of a DR signal according to the embodiment;

FIG. 6 is a sequence diagram illustrating an example of overall processing according to the embodiment;

FIG. 7 is a sequence diagram illustrating an example of DR signal determination processing according to the embodiment;

FIG. 8 is a flowchart illustrating an example of an operation for determining the DR signal with the frequency type according to the embodiment; and FIG. 9 is a flowchart illustrating an example of an operation for determining the DR signal with the voltage type according to the embodiment.

Figure 1:
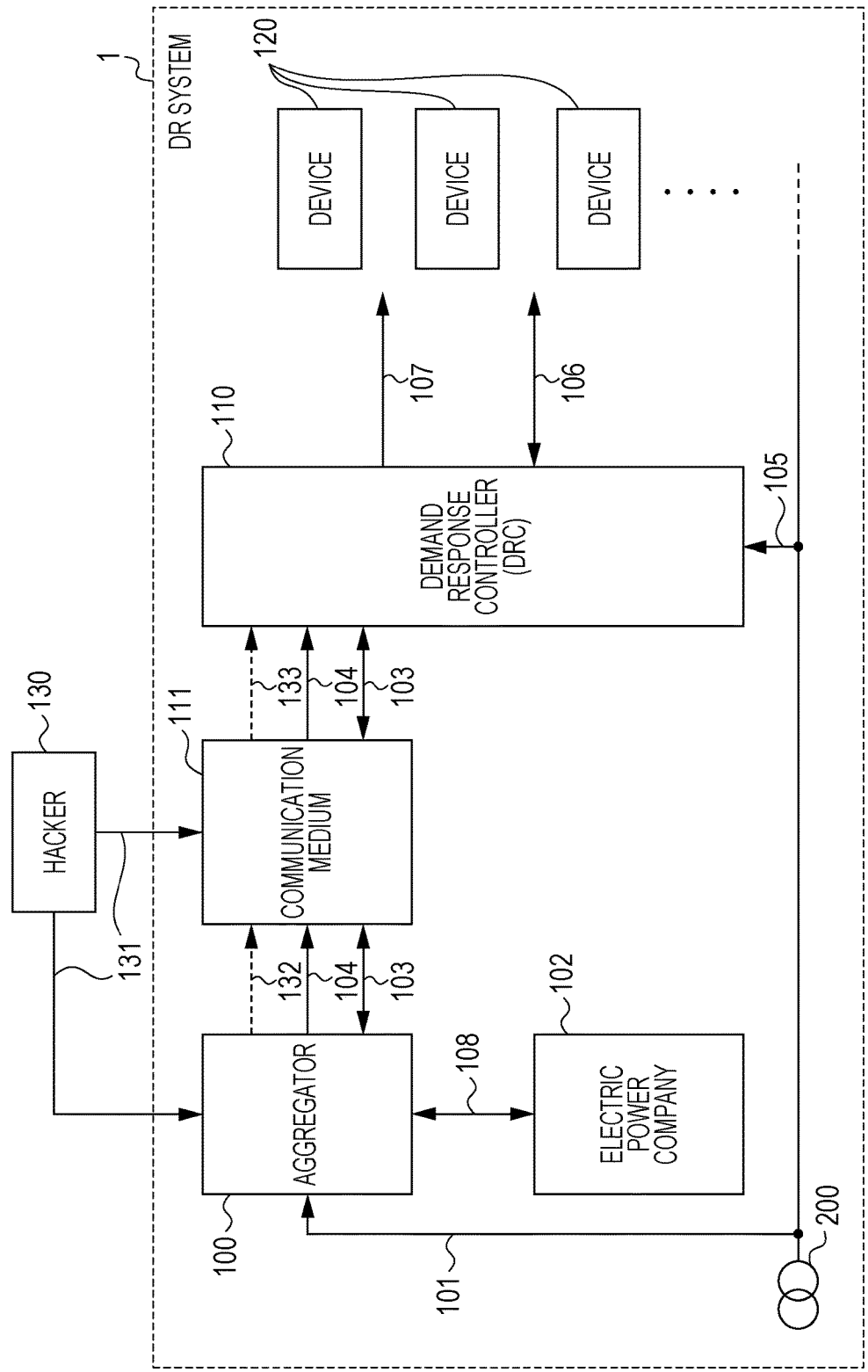
FIG. 1 is a system configuration diagram illustrating an example of a DR system according to an embodiment.

DETAILED DESCRIPTION (Underlying Knowledge Forming Basis of the Present Disclosure)

In recent years, introduction of demand response (hereinafter, referred to as "DR") has been considered. In DR, reduction of the amount of power supplied to a customer when the power supply is tight, adjustment of the system frequency of an electric power system, adjustment of the system voltage of an electric power system, or the like is performed. For example, when DR is executed between an electric aggregator or an electric utility and a customer, the customer has a demand response controller (DRC). In this case, the aggregator transmits a demand response signal (DR signal) to the DRC. The DRC that has received the DR signal controls power supplied to a household electrical appliance such as an air conditioner that the customer has or discharge and charge of a storage battery or the like. Various DR operations described above are thus performed.

However, when the DR signal is transmitted via a communication network, it is possible that the DR signal is falsified on the communication network by a third party such as a hacker who is not permitted to change the DR signal, for example. In this case, the DRC performs control of the device in accordance with an unauthorized DR signal subjected to the falsification. With this, even when the customer is requested to decrease power consumption because the power supplied from the electric power system is tight, the falsification of the DR signal may cause the device to be controlled to increase the power consumption of the customer, for example. As a result, the power supplied from the electric power system may become even tighter to cause a power failure, for example.

By contrast, a device control apparatus according to the present disclosure is a device control apparatus includes: a detector that detects a parameter that indicates a state of an electric power system; a first communication interface that communicates with a device that receives power supplied from the electric power system; a second communication interface that receives a demand response signal from a server that monitors a state of the electric power system; and a control circuit that controls the device via a first communication interface. The demand response signal contains either first information or second information, the first information indicating an instruction for increasing the amount of power supplied from the electric power system to the device, the second information indicating an instruction for decreasing the amount of power supplied from the electric power system to the device, and the control circuit determines whether control of the device is performed in accordance with the demand response signal based on the first information or second information contained in the received demand response signal and the detected parameter.

With this configuration, because the device control apparatus determines whether control of the device is performed in accordance with the DR signal, control of the device can be prevented from being performed in accordance with an unauthorized DR signal. As a result, the electric power system can be prevented from being harmed.

Furthermore, when the state indicated by the detected parameter is a state in which the amount of power supplied from the electric power system to the device has to be increased and the information contained in the demand response signal is the first information, the control circuit may perform control of the device in accordance with the demand response signal.

With this configuration, because the device control apparatus determines whether control of the device is performed in accordance with the DR signal by using only the state of the electric power system and the information contained in the DR signal, control of the device can be easily prevented from being performed in accordance with an unauthorized DR signal.

Furthermore, when the state indicated by the detected parameter is a state in which the amount of power supplied from the electric power system to the device has to be decreased and the information contained in the demand response signal is the second information, the control circuit may perform control of the device in accordance with the demand response signal.

With this configuration, because the device control apparatus determines whether control of the device is performed in accordance with the DR signal by using only the state of the electric power system and the information contained in the DR signal, control of the device can be easily prevented from being performed in accordance with an unauthorized DR signal.

Furthermore, the detector may detect a system frequency being the frequency of the electric power system as the parameter and the control circuit determines whether control of the device is performed in accordance with the demand response signal based on the first information or second information contained in the received demand response signal and the detected system frequency.

With this configuration, because the device control apparatus determines whether control of the device is performed in accordance with the DR signal by using the detected frequency of the electric power system and the information contained in the received DR signal, control of the device can be prevented from being performed in accordance with an unauthorized DR signal in DR controlling frequencies.

Furthermore, in a case where the demand response signal contains the first information, the control circuit may perform control for increasing the amount of power supplied from the electric power system to the device when the system frequency is higher than a predetermined reference frequency, and perform control for not increasing the amount of power supplied from the electric power system to the device when the system frequency is lower than the reference frequency.

With this configuration, control of the device can be prevented from being performed in accordance with an unauthorized DR signal in DR controlling frequencies.

Furthermore, in a case where the demand response signal contains the second information, the control circuit may perform control for decreasing the amount of power supplied from the electric power system to the device when the system frequency is lower than the reference frequency and perform control for not decreasing the amount of power supplied from the electric power system to the device when the system frequency is higher than the reference frequency.

With this configuration, control of the device can be prevented from being performed in accordance with an unauthorized DR signal in DR controlling frequencies.

Furthermore, the detector may detect a system voltage being the voltage of the electric power system as the parameter and the control circuit determines whether control of the device is performed in accordance with the demand response signal based on the first information or second information contained in the received demand response signal and the detected voltage of the electric power system.

With this configuration, because the device control apparatus determines whether control of the device is performed in accordance with the DR signal by using the detected voltage of the electric power system and the information contained in the received DR signal, control of the device can be prevented from being performed in accordance with an unauthorized DR signal in DR controlling voltages.

Furthermore, in a case where the demand response signal contains the first information, the control circuit may perform control for increasing the amount of power supplied from the electric power system to the device when the system voltage is higher than a predetermined reference voltage and perform control for not increasing the amount of power supplied from the electric power system to the device when the system voltage is lower than the reference voltage.

With this configuration, control of the device can be prevented from being performed in accordance with an unauthorized DR signal in DR controlling voltages.

Furthermore, in a case where the demand response signal contains the second information, the control circuit may perform control for decreasing the amount of power supplied from the electric power system to the device when the system voltage is lower than the reference voltage and perform control for not decreasing the amount of power supplied from the electric power system to the device when the system voltage is higher than the reference voltage.

With this configuration, control of the device can be prevented from being performed in accordance with an unauthorized DR signal in DR controlling voltages.

Furthermore, when the control circuit determines that control of the device is not performed in accordance with the demand response signal, the control circuit may cause a predetermined reporting unit to make a report thereof.

With this configuration, the user can know that there is a possibility that the DR signal is hacked by a hacker or the like from the reporting unit.

Furthermore, a demand response method according to the present disclosure is a demand response method including: detecting a parameter that indicates a state of an electric power system; receiving a demand response signal from a server that monitors a state of the electric power system, the demand response signal contains first information or second information, the first information indicating an instruction for increasing the amount of power supplied from the electric power system to the device, the second information indicating an instruction for decreasing the amount of power supplied from the electric power system to the device; and determining whether control of the device is performed in accordance with the demand response signal based on the first information or the second information contained in the received demand response signal and the detected parameter.

With this configuration, whether control of the device is performed in accordance with the DR signal is determined, and thus control of the device can be prevented from being performed in accordance with an unauthorized DR signal. As a result, the electric power system can be prevented from being harmed.

Furthermore, a device control apparatus according to the present disclosure is a device control apparatus in a demand response system that executes demand response by controlling the amount of power supplied from an electric power system to a device that a customer has via a communication network. The device control apparatus includes a detector that detects power consumption of the device, a storage that stores therein the power consumption detected by the detector, a first communication interface that communicates with the device that receives power supplied from the electric power system, a second communication interface that receives a demand response signal that indicates an instruction for decreasing the amount of power supplied from the electric power system to the device from a server that monitors a state of the electric power system, and a control circuit that controls the device via the first communication interface. In a case where the power consumption of the device is lower than a predetermined reference amount of power when the demand response signal is received, the control circuit does not perform control of the device in accordance with the demand response signal.

With this configuration, when the power consumption of the device that the customer has is lower than a predetermined reference amount of power, control of the device is not performed in accordance with the DR signal, and thus, control of the device can be prevented from being performed in accordance with an unauthorized DR signal. As a result, the electric power system can be prevented from being harmed.

Furthermore, a demand response method according to the present disclosure is a demand response method in a demand response system that executes demand response by controlling the amount of power supplied from an electric power system to a device that a customer has via a communication network. The demand response method includes detecting power consumption of the device, storing the power consumption detected by the detecting, and receiving a demand response signal that indicates an instruction for decreasing the amount of power supplied from the electric power system to the device from a server that monitors a state of the electric power system. With the demand response method, in a case where the power consumption of the device is lower than a predetermined reference amount of power when the demand response signal is received, control of the device is not performed in accordance with the demand response signal.

With this configuration, when the power consumption of the device that the customer has is lower than a predetermined reference amount of power, control of the device is not performed in accordance with the DR signal, and thus, control of the device can be prevented from being performed in accordance with an unauthorized DR signal. As a result, the electric power system can be prevented from being harmed.

A specific embodiment will be described below with reference to the drawings.

Each of the embodiments described below represents a comprehensive or a specific example. A numerical value, a component, an arrangement position and a connection form of a component, a step, an order of steps, or the like is an example and is not intended to limit the present disclosure. Furthermore, out of the components described in the embodiments below, any component that is not described in an independent claim indicating the highest order concept will be described as an optional component.

(Embodiment)

An embodiment will be described below with reference to FIGS. 1 to 9.

FIG. 1 is a system configuration diagram illustrating an example of a DR system according to an embodiment.

A DR system 1 according to the present embodiment is a system that executes DR with respect to a household electrical appliance such as an air conditioner, a storage battery, or the like. The DR system 1 includes an aggregator 100, an electric power company 102, an electric power system 200, a DRC 110, a communication medium 111, and a device 120. Furthermore, FIG. 1 illustrates a state in which a hacker 130 hacks a DR signal.

The aggregator 100 collects a plurality of customers and transmits a DR signal to the DRC 110 that each of the customers has, in accordance with a contract made with each of the customers. When the aggregator 100 broadcasts a DR signal, the aggregator 100 may not transmit a DR signal to the DRC 110 that each of the customers has, in accordance with a contract made with each of the customers. Furthermore, the aggregator 100 here may be a device or a system that performs the above-described operation.

The electric power company 102 manages the electric power system 200. It should be noted that the electric power company 102 may be a system operator or an electric utility.

The DRC 110 receives the DR signal transmitted from the aggregator 100 via the communication medium 111 and controls the device 120 in accordance with the DR signal. Furthermore, in the present embodiment, the DRC 110 detects, from the electric power system 200, a parameter that indicates a state of the electric power system 200. This parameter is a frequency or a voltage, for example.

The communication medium 111 is a communication network such as the Internet or Wireless Fidelity (WiFi), for example. The DR signal is transmitted from the aggregator 100 to the DRC 110 via the communication medium 111.

The device 120 is a device that consumes power with the electric power system 200 or a device that supplies power to the electric power system 200. The device 120 is a household electrical appliance such as an air conditioner, a storage battery, or the like, for example, and had by a customer.

Between the aggregator 100 and the electric power company 102, communication of data 108 is performed. The data 108 is information of a contract related to DR that is made between the aggregator 100 and an electric power company 102, data indicating an execution result of DR, or the like, for example. The aggregator 100 causes each of the customers collected by the aggregator 100 to execute DR based on the information of contracts made with the electric power company 102. Furthermore, once DR has been executed, the data indicating an execution result of DR is transmitted to the electric power company 102. This will be described later in details.

Between the aggregator 100 and the electric power system 200, communication of data 101 is performed. The data 101 is a parameter that indicates a state of the electric power system 200 detected by the aggregator 100, for example. The parameter that indicates a state of the electric power system 200 may be a frequency of the electric power system (hereinafter, may be referred to as "system frequency") or a voltage of the electric power system (hereinafter, may be referred to as "system voltage"), for example. When the aggregator 100 detects that the system frequency is shifted from a predetermined reference frequency, the aggregator 100 generates a DR signal such that the system frequency becomes closer to the reference frequency. In this manner, the aggregator 100 generates a DR signal in accordance with the data 101. It should be noted that the aggregator 100 may not detect the data 101 from the electric power system 200. For example, the aggregator 100 may receive an instruction from the electric power company 102. In this case, when the system frequency of the electric power system 200 is shifted from the reference frequency, for example, the electric power company 102 instructs the aggregator 100 to cause the system frequency to become closer to the reference frequency. With this configuration, the aggregator 100 generates a DR signal in accordance with the instruction from the electric power company 102.

The aggregator 100 transmits a DR signal 104 generated via the communication medium 111 to the DRC 110.

Furthermore, the aggregator 100 performs transmission and reception of data 103 with the DRC 110. The data 103 is data that indicates a DR determination rule or an execution result of DR, for example. The DR determination rule is a rule that when a DR type, which will be described later, is a frequency type that controls the system frequency, for example, control is not performed that is for further increasing the shift of the system frequency with respect to the predetermined reference frequency. Furthermore, the DR determination rule is a rule that when the DR type, which will be described later, is a voltage type that controls the system voltage, for example, control is not performed that is for further increasing the shift of the system voltage with respect to the predetermined reference voltage. When control that is against the DR determination rule is performed, a power failure or the like may be caused. The DR determination rule is notified to the DRC 110 from the aggregator 100. Furthermore, the data that indicates an execution result of DR is a report of completion of DR execution and transmitted from the DRC 110 to the aggregator 100 as the data 103. Furthermore, the aggregator 100 having received the data that indicates an execution result of DR transmits the data that indicates an execution result of DR to the electric power company 102 as data 108. It should be noted that the data 103 and the data 108 may contain a service that the electric power company 102 receives when the DR is executed. More specifically, the data 103 and the data 108 may indicate that, from the DRC 110 had by each of the customers collected by the aggregator 100, the electric power company 102 receives a service such as improvement of the system frequency or the system voltage of the electric power system 200, for example.

The DRC 110 acquires data 105 related to the electric power system 200. The data 105 is a parameter that indicates a state of the electric power system 200 and is the system frequency or the system voltage, for example. The system frequency or the system voltage are detected by a sensor, for example, and transmitted to the DRC 110.

The DRC 110 performs communication with the device 120 and performs transmission and reception of data 106. The data 106 is data that indicates a state of the device 120 and, when the device 120 is an air conditioner, for example, is data that indicates whether the power source of the air conditioner is on and the setting temperature of the air conditioner. Furthermore, the data 106 is, when the device 120 is a storage battery, for example, data that indicates a state of charge (SOC).

The DRC 110 transmits a control signal 107 to the device 120. This control signal 107 is a signal for performing control of the device 120 in accordance with a DR signal. For example, the control signal 107 changes a command to turn off the power source of the air conditioner or the setting temperature of the air conditioner in accordance with the DR signal.

Next, a case where a hacker 130 performs hacking will be described.

The hacker 130 performs an unauthorized operation 131 to the aggregator 100 or the communication medium 111. When the hacker 130 hacks the aggregator 100 and falsifies the DR signal generated by the aggregator 100, the aggregator 100 transmits an unauthorized DR signal 132 subjected to the falsification to the DRC 110, and the DRC 110 receives the unauthorized DR signal. Furthermore, when the hacker 130 falsifies the DR signal in the communication medium 111, the aggregator 100 transmits an authorized DR signal 104, but the authorized DR signal 104 is changed to an unauthorized DR signal 133 in the communication medium 111. The DRC 110 thus receives the unauthorized DR signal 133. In a conventional DRC, data that indicates an execution result of the unauthorized DR is transmitted from the DRC 110 to the aggregator 100 as the data 103. Furthermore, the aggregator 100 that has received the data that indicates an execution result of the unauthorized DR transmits the data that indicates an execution result of the unauthorized DR to the electric power company 102 as data 108. As described above, there has been a possibility that the electric power company 102 receives an unauthorized service caused by execution of an unauthorized DR from the DRC 110 had by each of the customers collected by the aggregator 100.

As described above, in the DR system 1, there is a possibility that a DR signal is changed to an unauthorized DR signal by a hacker 130 or the like.

Next, as another example of the DR system 1 illustrated in FIG. 1, an electric power system including the function of the aggregator 100 will be described.

Figure 2:
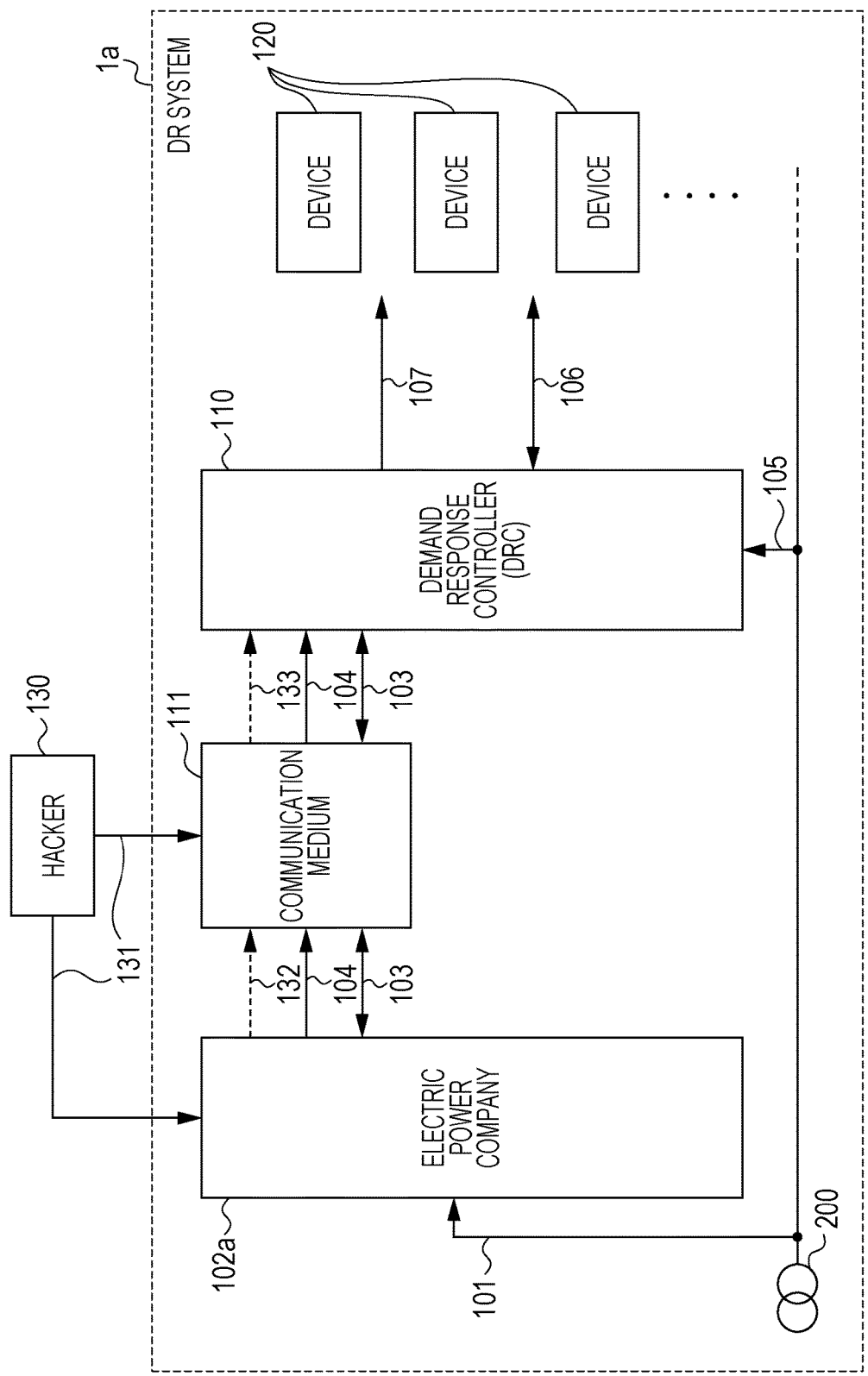
FIG. 2 is a system configuration diagram illustrating another example of a DR system according to the embodiment.

FIG. 2 is a system configuration diagram illustrating another example of a DR system according to the embodiment.

In a DR system 1a illustrated in FIG. 2, the aggregator 100 and the electric power company 102 in the DR system 1 illustrated in FIG. 1 are replaced with an electric power company 102a.

The electric power company 102a manages the electric power system 200 and further includes the function of the aggregator 100 illustrated in FIG. 1. With this configuration, the electric power company 102a transmits a DR signal to the DRC 110 similarly to the aggregator 100 in the DR system 1. However, similarly to the DR system 1, there is a possibility that a DR signal is changed to an unauthorized DR signal by a hacker 130 or the like.

Next, the functions of the DRC 110 and the aggregator 100 in the DR system 1 illustrated in FIG. 1 will be described with reference to FIG. 3.

Figure 3:
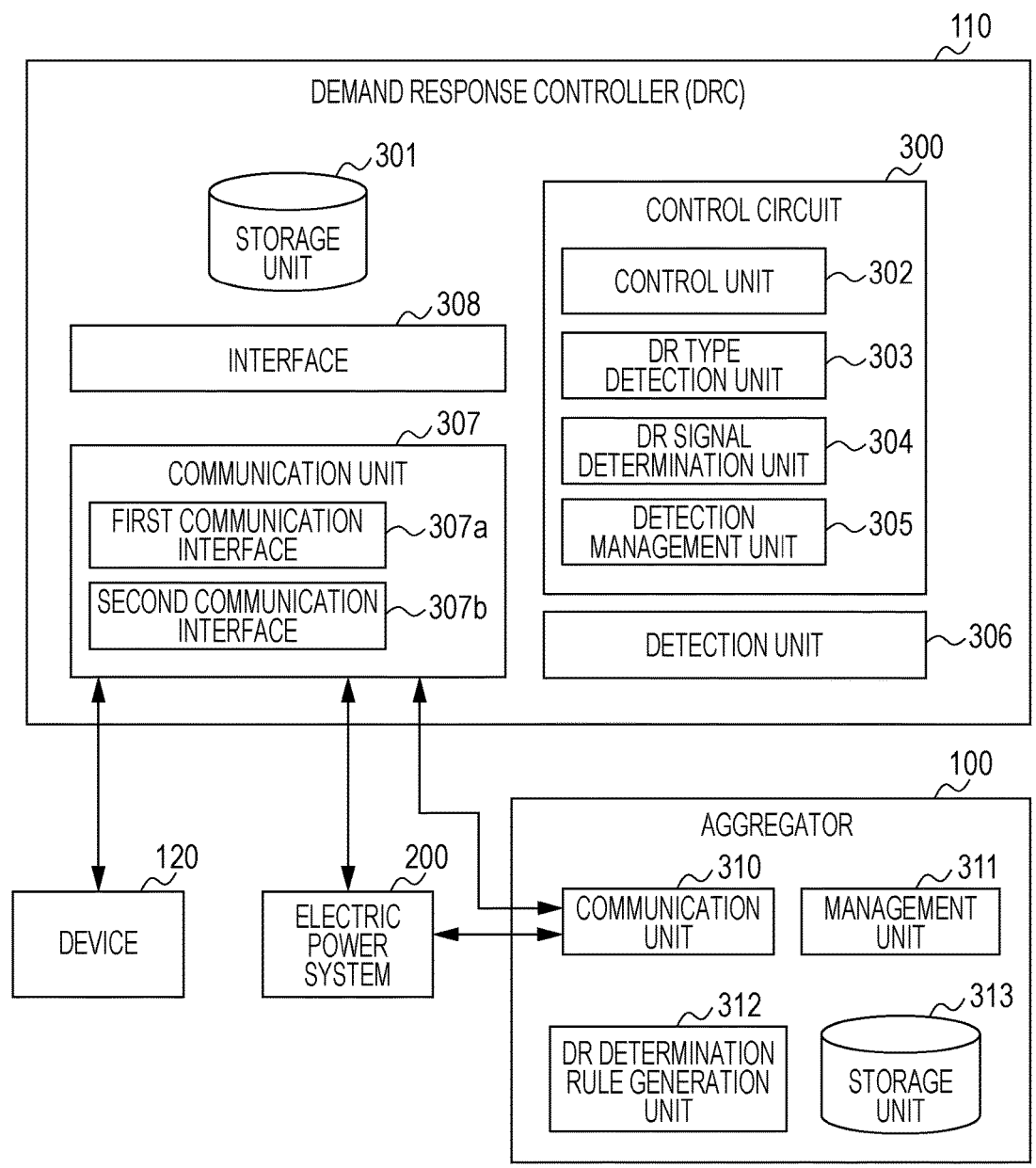
FIG. 3 is a block diagram illustrating an example of configurations of a DRC and an aggregator according to the embodiment.

FIG. 3 is a block diagram illustrating an example of configurations of a DRC 110 and an aggregator 100 according to the embodiment. The electric power company 102a in the DR system 1a illustrated in FIG. 2 also includes the same function as that of the aggregator 100 in the DR system 1 illustrated in FIG. 1, and thus, the description of the function of the DRC 110 and the electric power company 102*a* in the DR system 1*a* will be omitted.

The DRC 110 includes a control circuit 300, a storage unit 301, a detection unit 306, a communication unit 307, and an interface 308.

The control circuit 300 includes a control unit 302, a DR type detection unit 303, a DR signal determination unit 304, and a detection management unit 305.

The control unit 302 controls the device 120 in accordance with a DR signal via the communication unit 307. Furthermore, when the DR type, which will be described later, is a schedule type, the control unit 302 controls the device 120 in accordance with a preset DR at a preset time with a timer or the like, for example.

The DR type detection unit 303 detects the DR type of the DR signal received by the communication unit 307.

The DR signal determination unit 304 uses an instruction indicated by information contained in the DR signal received by the communication unit 307 and a parameter detected by the detection unit 306 to determine whether control of the device 120 is performed in accordance with the DR signal.

In this example, the unauthorized DR signal is a DR signal containing an instruction that is against the DR determination rule. For example, when the DR type, which will be described later, is the frequency type, the unauthorized DR signal contains an instruction for further increasing the shift of the system frequency with respect to the predetermined reference frequency. Specifically, when the predetermined reference frequency is 50 Hz, the system frequency of the electric power system 200 detected by the detection unit 306, which will be described later, is 49.8 Hz, a DR signal that contains an instruction for further decreasing the system frequency is an unauthorized DR signal.

The DR signal received by the communication unit 307 contains either of first information that indicates an instruction for increasing the amount of power supplied from the electric power system 200 to the device 120 and second information that indicates an instruction for decreasing the amount of power supplied from the electric power system 200 to the device 120.

The DR signal determination unit 304 performs control of the device 120 in accordance with the DR signal when a state of the electric power system 200 indicated by the detected parameter is the state in which the amount of power supplied from the electric power system 200 to the device 120 is to be increased and information contained in the DR signal is the first information. Furthermore, the DR signal determination unit 304 performs control of the device 120 in accordance with the DR signal when a state of the electric power system 200 indicated by the detected parameter is the state in which the amount of power supplied from the electric power system 200 to the device 120 is to be decreased and information contained in the DR signal is the second information.

In this example, the first information indicates an instruction for increasing the amount of power supplied from the electric power system 200 to the device 120. When the DR type, which will be described later, is the frequency type, the first information is to be an instruction for decreasing the system frequency of the electric power system 200 and increasing the load with respect to the device 120. Furthermore, when the DR type, which will be described later, is the voltage type, the first information is to be an instruction for decreasing the system voltage of the electric power system 200 and absorbing reactive power with respect to the device 120. The second information indicates an instruction for decreasing the amount of power supplied from the electric power system 200 to the device 120. When the DR type, which will be described later, is the frequency type, the second information is to be an instruction for increasing the system frequency of the electric power system 200 and decreasing the load with respect to the device 120. Furthermore, when the DR type, which will be described later, is the voltage type, the second information is to be an instruction for increasing the system voltage of the electric power system 200 and generating reactive power with respect to the device 120.

When the DR type, which will be described later, is the frequency type, the state in which the amount of power supplied from the electric power system 200 to the device 120 is to be increased is a state in which the system frequency is higher than the predetermined reference frequency. When the DR type, which will be described later, is the voltage type, the state in which the amount of power supplied from the electric power system 200 to the device 120 is to be increased is a state in which the system voltage is higher than the predetermined reference voltage. Furthermore, when the DR type, which will be described later, is the frequency type, the state of the electric power system 200 in which the amount of power supplied from the electric power system 200 to the device 120 is to be decreased is a state in which the system frequency is lower than the predetermined reference frequency. When the DR type, which will be described later, is the voltage type, the state of the electric power system 200 in which the amount of power supplied from the electric power system 200 to the device 120 is to be decreased is a state in which the system voltage is lower than the predetermined reference voltage.

The detection management unit 305 determines when and how long what parameter is to be detected by the detection unit 306, out of parameters indicating the state of the electric power system 200. For example, the detection management unit 305 determines that the detection unit 306 detects the system frequency of the electric power system 200 for 5 minutes.

In the present embodiment, the control circuit 300 includes the control unit 302, the DR type detection unit 303, the DR signal determination unit 304, and the detection management unit 305. However, the embodiment is not limited thereto. For example, it is sufficient that the control circuit 300 includes the control unit 302 and the DR signal determination unit 304. The control circuit 300 may not include the DR type detection unit 303 and the detection management unit 305.

The storage unit 301 stores therein a parameter that indicates a DR determination rule notified from the aggregator 100 and a state of the electric power system 200 detected by the detection unit 306.

The detection unit 306 detects a parameter that indicates the state of the electric power system 200 determined by the detection management unit 305. It should be noted that the detection unit 306 may acquire data from a sensor that detects the parameter that indicates the state of the electric power system 200. Furthermore, the detection unit 306 may be a sensor that detects the parameter that indicates the state of the electric power system 200. The detection unit 306 may be included in the control circuit 300.

The communication unit 307 includes a first communication interface 307*a* and a second communication interface 307*b*. The first communication interface 307*a* communicates with the device 120 that receives power supplied from the electric power system 200. The second communication interface 307*b* receives a DR signal from a server (the aggregator 100) that monitors the state of the electric power system 200. In addition, the communication unit 307 performs all types of communication related to the DRC 110.

The interface 308 receives an input from a recording medium such as a universal serial bus (USB) or a magnetic disc (MD), for example. Furthermore, the interface 308 may be a user interface for transmitting a message or a warning from a user via a touch panel or the like included in the DRC 110, for example.

The aggregator 100 includes a communication unit 310, a management unit 311, a DR determination rule generation unit 312, and a storage unit 313.

The communication unit 310 communicates with the electric power system 200 and the DRC 110.

The management unit 311 performs control of the aggregator 100. For example, the management unit 311 performs control of the communication unit 310, the DR determination rule generation unit 312, or the like.

The DR determination rule generation unit 312 generates a DR determination rule serving as a rule used for determination at the DR signal determination unit 304 included in the DRC 110. The DR determination rule generated by the DR determination rule generation unit 312 is notified to the DRC 110 and stored in the storage unit 301.

The storage unit 313 stores therein information such as data and a program.

Next, the DR type of the DR signal detected by the DR type detection unit 303 will be described.

Figure 4:
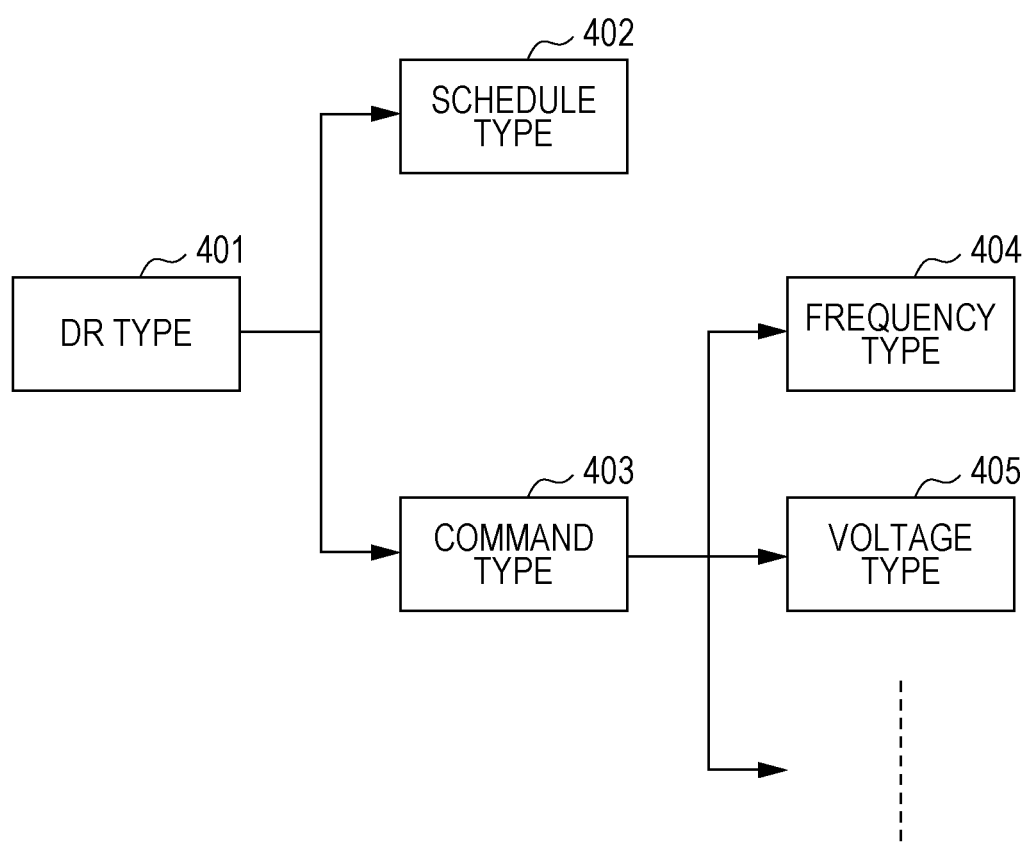
FIG. 4 is a conceptual diagram illustrating an example of a DR type according to the embodiment.

FIG. 4 is a conceptual diagram illustrating an example of a DR type according to the embodiment.

A DR type 401 of the DR signal includes two types of a schedule type 402 and a command type 403, as illustrated in FIG. 4. With the schedule type 402, the DRC 110 starts DR with respect to the device 120 at a preset time with a timer or the like, for example. With the command type 403, the DRC 110 starts DR with respect to the device 120 by receiving a command from the aggregator 100 or the like. With the schedule type 402, no DR signal from outside is received, that is, no unauthorized DR signal subjected to falsification by the hacker 130 or the like is received. According to the present disclosure, in DR with the command type 403, control of the device can be prevented from being performed in accordance with an unauthorized DR signal.

The command type 403 further includes a frequency type 404, a voltage type 405, or other type, as illustrated in FIG. 4. With the frequency type 404, the device 120 is controlled such that the system frequency of the electric power system 200 becomes the predetermined reference frequency. With the voltage type 405, the device 120 is controlled such that the system voltage of the electric power system 200 becomes the predetermined reference voltage. For example, with the frequency type, when the system frequency of the electric power system 200 is 49.8 Hz, the device 120 is controlled such that the system frequency becomes 50 Hz.

As described above, the DR type 401 includes two types of the schedule type 402 and the command type 403, and the command type 403 further includes the frequency type 404, the voltage type 405, or other type. Furthermore, according to the present disclosure, in DR with the command type 403, which has a possibility of being affected by the hacker 130 or the like, not with the schedule type 402, control of the device can be prevented from being performed in accordance with an unauthorized DR signal.

Next, the details of a packet of the DR signal received by the DRC 110 will be described.

FIGS. 5A and 5B are diagrams illustrating examples of a packet of a DR signal according to the embodiment. FIG. 5A is a diagram illustrating an example of a packet of a DR signal with a frequency type. FIG. 5B is a diagram illustrating an example of a packet of a DR signal with a voltage type. In a packet 1 illustrated in FIGS. 5A and 5B, information that indicates the DR type of the DR signal is stored. In a packet 2 illustrated in FIGS. 5A and 5B, information that indicates the contents of the control performed with respect to the device 120 is stored. In a packet 3 illustrated in FIGS. 5A and 5B, information that indicates an electric power value of the device 120 or a permissible range of an electric power value of the device 120 is stored.

When the DRC 110 receives the DR signal illustrated in FIG. 5A, the DR type detection unit 303 detects that the received DR signal is with the frequency type by referring to the packet 1. Furthermore, the DR signal determination unit 304 refers to the packet 2, and, when the information stored in the packet 2 is not against the DR determination rule, performs control of the device 120 in accordance with the information stored in the packet 2. For example, when the information stored in the packet 2 is information that indicates increasing the load of the device 120, that is, information that indicates decreasing the system frequency of the electric power system 200, and there is no problem with decreasing the system frequency of the electric power system 200 in accordance with the DR determination rule, the control unit 302 performs control for increasing the load of the device 120 in accordance with the DR signal. The device 120 is controlled such that the electric power value of the device 120 becomes the electric power value stored in the packet 3 or within the permissible range of the electric power value.

When the DRC 110 receives the DR signal illustrated in FIG. 5B, the DR type detection unit 303 detects that the received DR signal is with the voltage type by referring to the packet 1. Furthermore, the DR signal determination unit 304 refers to the packet 2, and, when the information stored in the packet 2 is not against the DR determination rule, performs control of the device 120 in accordance with the information stored in the packet 2. For example, when the information stored in the packet 2 is information that indicates causing the device 120 to generate reactive power, that is, information that indicates increasing the system voltage of the electric power system 200, and there is no problem with increasing the system voltage of the electric power system 200 in accordance with the DR determination rule, the control unit 302 performs control for causing the device 120 to generate reactive power in accordance with the DR signal. The device 120 is controlled such that the electric power value of the device 120 becomes the electric power value stored in the packet 3 or within the permissible range of the electric power value.

The packets of the DR signal in the present embodiment are merely examples. A data format of the DR signal may be stipulated in accordance with a format of automated demand response (ADR).

As described above, the DRC 110 performs control of the device 120 by using an instruction indicated by a packet contained in the received DR signal.

Next, an operation performed by the DR system 1 in the present embodiment that has a structure as illustrated in FIG. 1 will be described.

FIG. 6 is a sequence diagram illustrating an example of overall processing according to the embodiment.

The DRC 110 firstly performs processing for making a DR contract with the aggregator 100 (S501). The DR contract is a contract for performing DR with the schedule type, a contract for performing DR with the frequency type or the voltage type from the command type, a contract in which a time zone for performing DR is set, or the like, for example. When the DR contract is a contract for performing DR with the frequency type or the voltage type from the command type, the DR contract also sets the predetermined reference frequency with respect to the system frequency or the predetermined reference voltage with respect to the system voltage. The reference frequency is 50 Hz, for example, and the reference voltage is 105 V, for example.

Next, the aggregator 100 notifies the DRC 110 of the DR determination rule (S502). The DR determination rule is a rule that when the DR type is the frequency type, control for further increasing the shift of the system frequency with respect to the reference frequency is not performed, for example. In the DR determination rule, to be specific, in a case where the system frequency is 49.8 Hz when the reference frequency is 50 Hz, control for further decreasing the system frequency, that is, control for increasing the load of the device 120 is prohibited. Furthermore, in the DR determination rule, to be specific, in a case where the system frequency is 50.2 Hz when the reference frequency is 50 Hz, control for further increasing the system frequency, that is, control for decreasing the load of the device 120 is prohibited. It should be noted that the method with which the DR determination rule is notified from the aggregator 100 to the DRC 110 may be any method as long as the method is safe with no risk of falsification by the hacker 130 or the like. For example, the DR determination rule may be notified to the DRC 110 via a USB when the DRC 110 is installed.

Once the contract has been made with the aggregator 100 and notification of the DR determination rule has been performed, the DRC 110 performs DR determination (S503). In the DR determination, the DRC 110 determines whether control of the device 120 is performed in accordance with the DR signal.

Once step S501 and step S502 have been performed, step S501 and step S502 are not performed again unless the contract is changed, for example, and step S503 is performed every time a DR signal is received.

Next, the details of the DR determination at step S503 will be described with reference to FIG. 7.

FIG. 7 is a sequence diagram illustrating an example of DR signal determination processing according to the embodiment.

The aggregator 100 transmits the DR signal to the DRC 110 via the communication medium 111 (S601). There is a possibility that the DR signal is falsified by the hacker 130 or the like in the aggregator 100 or the communication medium 111.

The DRC 110 receives the DR signal that may have been falsified by the hacker 130 or the like (S602).

The DR type detection unit 303 of the DRC 110 detects the type of the received DR signal (S603). Because the received DR signal is a signal transmitted from outside, the received DR signal is to be the command type, not the schedule type. The DR type detection unit 303 detects whether the received DR signal is with the frequency type or the voltage type, for example, from the command type. For example, the packet contained in the DR signal illustrated in FIG. 5A or 5B is checked, whereby the DR type is detected.

The DR contract made by the DRC 110 with the aggregator 100 may be checked. For example, when the checked DR contract is a contract for performing DR with the frequency type, the DRC 110 may not perform DR in the case of receiving the DR signal with the voltage type. Furthermore, when the checked DR contract is a contract in which a time zone for performing DR is set, for example, the DRC 110 may not perform DR in the case of receiving the DR signal at a time not in the set time zone. Furthermore, when no DR contract is made, for example, the DRC 110 may not perform DR even in the case of receiving the DR signal.

Furthermore, when the DRC 110 is an article dedicated for receiving either one of the DR signal with the frequency type and the DR signal with the voltage type, for example, the DRC 110 receives only either one of the DR signal with the frequency type and the DR signal with the voltage type. The DR type detection unit 303 thus may not detect the type of the DR signal.

The DR signal determination unit 304 of the DRC 110 determines the DR determination rule corresponding to the received DR signal from the DR determination rules stored in the storage unit 301 (S604). The DR determination rules stored in the storage unit 301 include a rule corresponding to the DR signal with the frequency type and a rule corresponding to the DR signal with the voltage type, for example. When the received DR signal is the DR signal with the frequency type, the DR signal determination unit 304 determines the rule corresponding to the DR signal with the frequency type. With the rule corresponding to the DR signal with the frequency type, control for further increasing the shift of the system frequency with respect to the predetermined reference frequency is not performed.

The detection unit 306 detects the parameter that indicates the state of the electric power system 200 (S605). When the DR type detected by the DR type detection unit 303 is the frequency type, the detection unit 306 detects the system frequency of the electric power system 200 out of parameters indicating the state of the electric power system 200. When the DR type detected by the DR type detection unit 303 is the voltage type, the detection unit 306 detects the system voltage of the electric power system 200 out of parameters indicating the state of the electric power system 200.

The DR signal determination unit 304 determines whether the received DR signal is an unauthorized DR signal (S606). Based on this, the DR signal determination unit 304 determines whether control of the device 120 is performed in accordance with the DR signal. More specifically, the DR signal determination unit 304 simulates whether the electric power system 200 is harmed when the device 120 is controlled in accordance with the instruction indicated by the information contained in the received DR signal.

For example, the DRC 110 receives the DR signal with the frequency type. When the instruction indicated by the information contained in the received DR signal is an instruction for increasing the load of the device 120, the device 120 is controlled in accordance with the instruction, whereby the system frequency of the electric power system 200 is decreased. When the system frequency of the electric power system 200 detected by the detection unit 306 is lower than the predetermined reference frequency, the device 120 is controlled in accordance with the received DR signal, whereby the system frequency of the electric power system 200 is further decreased. With this, the shift between the reference frequency and the system frequency is further increased to be against the DR determination rule stored in the storage unit 301. The DR signal determination unit 304 thus simulates that the electric power system 200 is harmed when the device 120 is controlled in accordance with the received DR signal. Accordingly, the DR signal determination unit 304 determines that the received DR signal is an unauthorized DR signal and thereby determines that control of the device 120 is not performed in accordance with the DR signal.

Furthermore, when the DR signal determination unit 304 simulates that the electric power system 200 is not harmed when the device 120 is controlled in accordance with the received DR signal, for example, the DR signal determination unit 304 determines that the received DR signal is an authorized DR signal and thereby determines that control of the device 120 is performed in accordance with the DR signal.

Next, when the received DR signal is an authorized DR signal, the DRC 110 controls the device 120 in accordance with the DR signal (S607). In a case where the instruction indicated by the information contained in the DR signal is an instruction for increasing the load of the device 120, when the device 120 is an air conditioner, for example, the load is increased with the power source of the air conditioner turned on or with the setting temperature of the air conditioner changed. Furthermore, in a case where the instruction indicated by the information contained in the DR signal is an instruction for decreasing the load of the device 120, when the device 120 is an air conditioner, for example, the load is decreased with the power source of the air conditioner turned off or with the setting temperature of the air conditioner changed.

The DRC 110 then notifies the aggregator 100 of the result of the DR (S608).

In this manner, the DRC 110 controls the device 120 in accordance with the received DR signal, and thereby simulates whether the electric power system 200 is harmed when the detected parameter indicating the state of the electric power system 200 is changed. In a case where the electric power system 200 is harmed when control of the device 120 is performed in accordance with the received DR signal, the DRC 110 determines that the received DR signal is an unauthorized DR signal. With this configuration, control of the device can be prevented from being performed in accordance with an unauthorized DR signal subjected to falsification by the hacker 130 or the like. As a result, the electric power system 200 can be prevented from being harmed.

Next, specific description of determination of the DR signal with the frequency type based on the DR determination rule stored in the storage unit 301 will be made.

FIG. 8 is a flowchart illustrating an example of an operation for determining the DR signal with the frequency type according to the embodiment.

In FIG. 8, in the case of Yes at S702 described later, the detection unit 306 detects a system frequency being the frequency of the electric power system 200 as the parameter indicating the state of the electric power system 200. The DR signal determination unit 304 then uses the instruction indicated by the information contained in the DR signal and the detected system frequency to determine whether control of the device 120 is performed in accordance with the DR signal. More specifically, the operations described below are performed.

Firstly, the DRC 110 receives the DR signal (S701).

A determination is made whether the DR type of the DR signal detected by the DR type detection unit 303 is the frequency time (S702). When the DR type of the received DR signal is not the frequency type (No at S702), the operation for determining the DR signal with the frequency type is not performed. It should be noted that when the received DR signal is the voltage type, an operation for determining the DR signal with the voltage type illustrated in FIG. 9 described later is performed.

When the DR type of the received DR signal is the frequency type (Yes at S702), the DR signal determination unit 304 determines whether the instruction indicated by the information contained in the received DR signal is an instruction for decreasing the load of the device 120 (S703).

When the DR signal contains the second information indicating an instruction for decreasing the amount of power supplied from the electric power system 200 to the device 120, that is, contains an instruction for decreasing the load of the device 120 (Yes at S703), the DR signal determination unit 304 determines whether the system frequency is lower than the predetermined reference frequency (S704).

When the system frequency is lower than the predetermined reference frequency (Yes at S704), the load of the device 120 is decreased, whereby the system frequency is increased. The shift between the system frequency and the predetermined reference frequency thus becomes smaller. Accordingly, because control for decreasing the load of the device 120 is not against the DR determination rule, the control unit 302 performs control of the device 120 in accordance with the DR signal (S705). More specifically, the control unit 302 performs control for decreasing the amount of power supplied from the electric power system 200 to the device 120. With the control unit 302 performing control for decreasing the amount of power supplied from the electric power system 200 to the device 120, the system frequency becomes closer to the predetermined reference frequency.

When the system frequency is higher than the reference frequency (No at S704), the load of the device 120 is decreased, whereby the system frequency is increased. The shift between the system frequency and the predetermined reference frequency thus becomes larger. Accordingly, because control for decreasing the load of the device 120 is against the DR determination rule, the control unit 302 does not perform control of the device 120 in accordance with the DR signal (S706). More specifically, the control unit 302 performs control for not decreasing the amount of power supplied from the electric power system 200 to the device 120. With the control unit 302 performing control for not decreasing the amount of power supplied from the electric power system 200 to the device 120, the shift between the system frequency and the predetermined reference frequency does not become larger.

When the DR signal contains the first information indicating an instruction for increasing the amount of power supplied from the electric power system 200 to the device 120, that is, contains an instruction for increasing the load of the device 120 (No at S703), the DR signal determination unit 304 determines whether the system frequency is higher than the predetermined reference frequency (S707).

When the system frequency is higher than the predetermined reference frequency (Yes at S707), the load of the device 120 is increased, whereby the system frequency is decreased. The shift between the system frequency and the predetermined reference frequency thus becomes smaller. Accordingly, because control for increasing the load of the device 120 is not against the DR determination rule, the control unit 302 performs control of the device 120 in accordance with the DR signal (S708). More specifically, the control unit 302 performs control for increasing the amount of power supplied from the electric power system 200 to the device 120. With the control unit 302 performing control for increasing the amount of power supplied from the electric power system 200 to the device 120, the system frequency becomes closer to the predetermined reference frequency.

When the system frequency is lower than the reference frequency (No at S707), the load of the device 120 is increased, whereby the system frequency is decreased. The shift between the system frequency and the predetermined reference frequency thus becomes larger. Accordingly, because control for increasing the load of the device 120 is against the DR determination rule, the control unit 302 does not perform control of the device 120 in accordance with the DR signal (S709). More specifically, the control unit 302 performs control for not increasing the amount of power supplied from the electric power system 200 to the device 120. With the control unit 302 performing control for not increasing the amount of power supplied from the electric power system 200 to the device 120, the shift between the system frequency and the predetermined reference frequency does not become larger.

In the operation for determining the DR signal with the frequency type, based on the DR determination rule, as described above, a determination is made whether control of the device 120 is performed in accordance with the DR signal.

Next, specific description of determination of the DR signal with the voltage type based on the DR determination rule stored in the storage unit 301 will be made.

FIG. 9 is a flowchart illustrating an example of an operation for determining the DR signal with the voltage type according to the embodiment.

In FIG. 9, in the case of Yes at S802 described later, the detection unit 306 detects a system voltage being the voltage of the electric power system 200 as the parameter indicating the state of the electric power system 200. The DR signal determination unit 304 then uses the instruction indicated by the information contained in the DR signal and the detected system voltage to determine whether control of the device 120 is performed in accordance with the DR signal. More specifically, the operations described below are performed.

Firstly, the DRC 110 receives the DR signal (S801).

A determination is made whether the DR type of the DR signal detected by the DR type detection unit 303 is the voltage time (S802). When the DR type of the received DR signal is not the voltage type (No at S802), the operation for determining the DR signal with the voltage type is not performed. It should be noted that when the received DR signal is the frequency type, the operation for determining the DR signal with the frequency type illustrated in FIG. 8 is performed.

When the DR type of the received DR signal is the voltage type (Yes at S802), the DR signal determination unit 304 determines whether the instruction indicated by the information contained in the received DR signal is an instruction for causing the device 120 to generate reactive power (S803).

When the DR signal contains the second information indicating an instruction for decreasing the amount of power supplied from the electric power system 200 to the device 120, that is, contains an instruction for causing the device 120 to generate reactive power (Yes at S803), the DR signal determination unit 304 determines whether the system voltage is lower than the predetermined reference voltage (S804).

When the system voltage is lower than the predetermined reference voltage (Yes at S804), the device 120 generates reactive power, whereby the system voltage is increased. The shift between the system voltage and the predetermined reference voltage thus becomes smaller. Accordingly, because control for causing the device 120 to generate reactive power is not against the DR determination rule, the control unit 302 performs control of the device 120 in accordance with the DR signal (S805). More specifically, the control unit 302 performs control for decreasing the amount of power supplied from the electric power system 200 to the device 120. With the control unit 302 performing control for decreasing the amount of power supplied from the electric power system 200 to the device 120, the system voltage becomes closer to the predetermined reference voltage.

When the system voltage is higher than the reference voltage (No at S804), the device 120 generate reactive power, whereby the system voltage is increased. The shift between the system voltage and the predetermined reference voltage thus becomes larger. Accordingly, because control for causing the device 120 to generate reactive power is against the DR determination rule, the control unit 302 does not perform control of the device 120 in accordance with the DR signal (S806). More specifically, the control unit 302 performs control for not decreasing the amount of power supplied from the electric power system 200 to the device 120. With the control unit 302 performing control for not decreasing the amount of power supplied from the electric power system 200 to the device 120, the shift between the system voltage and the predetermined reference voltage does not become larger.

When the DR signal contains the first information indicating an instruction for increasing the amount of power supplied from the electric power system 200 to the device 120, that is, contains an instruction for causing the device 120 to absorb reactive power (No at S803), the DR signal determination unit 304 determines whether the system voltage is higher than the predetermined reference voltage (S807).

When the system voltage is higher than the predetermined reference voltage (Yes at S807), the device 120 absorbs reactive power, whereby the system voltage is decreased. The shift between the system voltage and the predetermined reference voltage thus becomes smaller. Accordingly, because control for causing the device 120 to absorb reactive power is not against the DR determination rule, the control unit 302 performs control of the device 120 in accordance with the DR signal (S808). More specifically, the control unit 302 performs control for increasing the amount of power supplied from the electric power system 200 to the device 120. With the control unit 302 performing control for increasing the amount of power supplied from the electric power system 200 to the device 120, the system voltage becomes closer to the predetermined reference voltage.

When the system voltage is lower than the reference voltage (No at S807), the device 120 absorbs reactive power, whereby the system voltage is decreased. The shift between the system voltage and the predetermined reference voltage thus becomes larger. Accordingly, because control for causing the device 120 to absorb reactive power is against the DR determination rule, the control unit 302 does not perform control of the device 120 in accordance with the DR signal (S809). More specifically, the control unit 302 performs control for not increasing the amount of power supplied from the electric power system 200 to the device 120. With the control unit 302 performing control for not increasing the amount of power supplied from the electric power system 200 to the device 120, the shift between the system voltage and the predetermined reference voltage does not become larger.

In the operation for determining the DR signal with the voltage type, based on the DR determination rule, as described above, a determination is made whether control of the device 120 is performed in accordance with the DR signal.

As described above, with the device control apparatus and the demand response method according to the present embodiment, the detection unit 306 detects a parameter that indicates the state of the electric power system 200. The DR signal determination unit 304 of the control circuit 300 then performs control of the device 120 in accordance with the received DR signal based on the received DR signal and the parameter that indicates the state of the electric power system 200 detected by the detection unit 306, and thereby determines whether the control is against the DR determination rule. More specifically, the DR signal determination unit 304 simulates whether the electric power system 200 is harmed. When executing the received DR signal causes any harm on the electric power system 200, the control unit 302 of the control circuit 300 does not perform control of the device 120 in accordance with the received DR signal. With this configuration, control of the device can be prevented from being performed in accordance with an unauthorized DR signal.

(Modification of the Embodiment)

A device control apparatus and a demand response method according to one or more aspects have been described above based on the embodiment. However, the present disclosure is not limited to the embodiment. Various modifications that the skilled person can think of may be applied to the embodiment and components in a different embodiment may be combined to form another embodiment to be included in the scope of the one or more aspects, without departing from the spirit and scope of the present disclosure.

For example, each component of the device control apparatus may be implemented by a general-purpose or a dedicated circuit. Furthermore, the demand response method may be executed by a computer as a program.

Furthermore, when the control circuit 300 determines that control of the device 120 is not performed in accordance with the DR signal, the control circuit 300 may cause a predetermined reporting unit to make a report. With this configuration, the user can know that there is a possibility that the DR signal is hacked by the hacker 130 or the like.

Furthermore, when the DR signal determination unit 304 determines that control of the device 120 is not performed in accordance with the DR signal, the DRC 110 may check with the aggregator 100 about whether any unauthorization is found in the received DR signal. With this configuration, the aggregator 100 can know that there is a possibility that the DR signal is hacked by the hacker 130 or the like.

Furthermore, when the DR signal determination unit 304 determines that control of the device 120 is not performed in accordance with the DR signal for a predetermined number of times repeatedly, the control unit 302 may not perform control of the device 120 in accordance with the DR signal. With this configuration, the control unit 302 can be configured to not perform control of the device 120 in accordance with the DR signal only when there is a high possibility that the DR signal is falsified by the hacker 130 or the like.

Furthermore, the DRC 110 may perform control of the device 120 in accordance with power consumption of the device 120 that a customer has and the received DR signal. In this case, each component included in the DRC 110 may perform the operation described below.

The detection unit 306 detects power consumption of the device 120.

The storage unit 301 stores therein the power consumption detected by the detection unit 306.

The first communication interface 307*a* communicates with the device 120 that receives power supplied from the electric power system 200.

The second communication interface 307*b* receives the DR signal that indicates an instruction for decreasing the amount of power supplied from the electric power system 200 to the device 120 from the server (the aggregator 100) that monitors the state of the electric power system 200.

The control circuit 300 controls the device 120 via the first communication interface 307*a*.

When the power consumption of the device 120 is lower than the predetermined reference amount of power when the DR signal is received, the control circuit 300 does not perform control of the device 120 in accordance with the DR signal.

Specifically, the DRC 110 may perform the operation described below as an example.

When the DR signal contains information that indicates an instruction for decreasing the amount of power supplied from the electric power system 200 to the device 120, the DR signal determination unit 304 determines whether the power consumption of the device 120 detected by the detection unit 306 is lower than the predetermined reference amount of power.

When the power consumption of the device 120 is lower than the reference amount of power, the shift between the power consumption of the device 120 and the predetermined reference amount of power becomes larger. Accordingly, the control unit 302 does not perform control of the device 120 in accordance with the DR signal.

As described above, the DRC 110 may determine whether control of the device 120 is performed in accordance with the DR signal not only based on the system frequency or the system voltage which are parameters indicating the state of electric power system 200 but also based on the power consumption of the device 120, for example.

The present disclosure can be applied to a DRC that receives a DR signal from an aggregator, an electric power company, or the like. For example, use in an apartment building, an ordinary house, a corporation, a factory, or the like that has a DRC can be supposed, for example.

What is claimed is:

1. A device control apparatus, comprising:
a detector that detects a parameter that indicates a state of an electric power system;
a first communication interface that communicates with a device that receives power supplied from the electric power system;
a second communication interface that receives a demand response signal from a server that monitors a state of the electric power system; and
a control circuit that controls the device via a first communication interface, wherein
the demand response signal contains either first information or second information, the first information indicating an instruction for increasing an amount of power supplied from the electric power system to the device, the second information indicating an instruction for decreasing the amount of power supplied from the electric power system to the device, and
the control circuit determines whether the device is controlled in accordance with the demand response signal based on the first information or second information contained in the received demand response signal and the detected parameter, wherein the control circuit determines whether the received demand response signal contains the first information or the second information, in response to a determination that the received demand response signal contains the first information, the control circuit determines whether the detected parameter indicates a first state in which the amount of power supplied from the electric power system to the device has to be increased, in response to a determination that the detected parameter indicates the first state, the control circuit controls the device to increase an amount of power supplied from the electric power system to the device, in accordance with the first information contained in the demand response signal, in response to a determination that the detected parameter does not indicate the first state, the control circuit does not control the device in accordance with the first information contained in the demand response signal, in response to a determination that the received demand response signal contains the second information, the control circuit determines whether the detected parameter indicates a second state in which the amount of power supplied from the electric power system to the device has to be decreased, in response to a determination that the detected parameter indicates the second state, the control circuit controls the device to decrease an amount of power supplied from the electric power system to the device, in accordance with the second information contained in the demand response signal, in response to a determination that the detected parameter does not indicate the second state, the control circuit does not control the device in accordance with the second information contained in the demand response signal.

2. The device control apparatus according to claim 1, wherein when the control circuit determines that the device is not controlled in accordance with the demand response signal, the control circuit causes a reporter to report the control condition.

3. A device control apparatus comprising:

a detector that detects a system frequency that indicates a state of an electric power system;

a first communication interface that communicates with a device that receives power supplied from the electric power system;

a second communication interface that receives a demand response signal from a server that monitors a state of the electric power system; and a control circuit that controls the device via a first communication interface, wherein the demand response signal contains either first information or second information, the first information indicating an instruction for increasing an amount of power supplied from the electric power system to the device, the second information indicating an instruction for decreasing the amount of power supplied from the electric power system to the device, and the control circuit determines whether the device is controlled in accordance with the demand response signal based on the first information or second information contained in the received demand response signal and the detected system frequency, wherein the control circuit determines whether the received demand response signal contains the first information or the second information, in response to a determination that the received demand response signal contains the first information, the control circuit determines whether the detected system frequency is higher than a first reference frequency, in response to a determination that the detected system frequency is higher than the first reference frequency, the control circuit controls the device to increase an amount of power supplied from the electric power system to the device in accordance with the first information contained in the demand response signal, in response to a determination that the detected system frequency is lower than the first reference frequency, the control circuit does not control the device in accordance with the first information contained in the demand response signal, in response to a determination that the received demand response signal contains the second information, the control circuit determines whether the detected system frequency is lower than a second reference frequency, in response to a determination that the detected system frequency is lower than the second reference frequency, the control circuit controls the device to decrease an amount of power supplied from the electric power system to the device in accordance with the second information contained in the demand response signal, in response to a determination that the detected system frequency is higher than the second reference frequency, the control circuit does not control the device in accordance with the second information contained in the demand response signal.

4. A device control apparatus comprising:

a detector that detects a system voltage that indicates a state of an electric power system;

a first communication interface that communicates with a device that receives power supplied from the electric power system;

a second communication interface that receives a demand response signal from a server that monitors a state of the electric power system; and a control circuit that controls the device via a first communication interface, wherein the demand response signal contains either first information or second information, the first information indicating an instruction for increasing an amount of power supplied from the electric power system to the device, the second information indicating an instruction for decreasing the amount of power supplied from the electric power system to the device, and the control circuit determines whether the device is controlled in accordance with the demand response signal based on the first information or second information contained in the received demand response signal and the detected system voltage, wherein the control circuit determines whether the received demand response signal contains the first information or the second information, in response to a determination that the received demand response signal contains the first information, the control circuit determines whether the detected system voltage is higher than a first reference voltage, in response to a determination that the detected system voltage is higher than the first reference voltage, the control circuit controls the device to increase an amount of power supplied from the electric power system to the device in accordance with the first information contained in the demand response signal, in response to a determination that the detected system voltage is lower than the first reference voltage, the control circuit does not control the device in accordance with the first information contained in the demand response signal, in response to a determination that the received demand response signal contains the second information, the control circuit determines whether the detected system voltage is lower than a second reference voltage, in response to a determination that the detected system voltage is lower than the second reference frequency, the control circuit controls the device to decrease an amount of power supplied from the electric power system to the device in accordance with the second information contained in the demand response signal, in response to a determination that the detected system frequency is higher than the second reference voltage, the control circuit does not control the device in accordance with the second information contained in the demand response signal.

5. A demand response method, comprising:

detecting a parameter that indicates a state of an electric power system;

receiving a demand response signal from a server that monitors a state of the electric power system, the demand response signal contains first information or second information, the first information indicating an instruction for increasing an amount of power supplied from the electric power system to the device, the second information indicating an instruction for decreasing the amount of power supplied from the electric power system to the device; and determining whether the device is controlled in accordance with the demand response signal based on the first information or the second information contained in the received demand response signal and the detected parameter, wherein the determining comprises:

determining whether the received demand response signal contains the first information or the second information, in response to a determination that the received demand response signal contains the first information, determining whether the detected parameter indicates a first state in which the amount of power supplied from the electric power system to the device has to be increased, in response to a determination that the detected parameter indicates the first state, performing control of the device to increase an amount of power supplied from the electric power system to the device in accordance with the first information contained in the demand response signal, in response to a determination that the detected parameter does not indicate the first state, prohibiting the control of the device in accordance with the first information contained in the demand response signal, in response to a determination that the received demand response signal contains the second information, determining whether the detected parameter indicates a second state in which the amount of power supplied from the electric power system to the device has to be decreased, in response to a determination that the detected parameter indicates the second state, perform control of the device to decrease an amount of power supplied from the electric power system to the device, in accordance with the second information contained in the demand response signal, in response to a determination that the detected parameter does not indicate the second state, prohibiting the control of the device in accordance with the second information contained in the demand response signal.

* * * * *